United States Patent
De Vuono et al.

(10) Patent No.: US 9,137,415 B2
(45) Date of Patent: Sep. 15, 2015

(54) USING A SECURITY FEATURE WITH A DIGITAL IMAGE FILE

(71) Applicant: Voir Inc., San Francisco, CA (US)

(72) Inventors: Stefano De Vuono, San Francisco, CA (US); Kimberly Gordon, San Francisco, CA (US)

(73) Assignee: Depict, Inc., San Francisco, CA (US)

( * ) Notice: Subject to any disclaimer, the term of this patent is extended or adjusted under 35 U.S.C. 154(b) by 131 days.

(21) Appl. No.: 14/167,618

(22) Filed: Jan. 29, 2014

(65) Prior Publication Data
US 2015/0215492 A1    Jul. 30, 2015

(51) Int. Cl.
| | |
|---|---|
| G06K 9/00 | (2006.01) |
| H04N 1/32 | (2006.01) |
| G06F 21/10 | (2013.01) |
| G06F 21/16 | (2013.01) |
| G06T 1/00 | (2006.01) |
| G06T 11/60 | (2006.01) |
| G06F 11/30 | (2006.01) |

(52) U.S. Cl.
CPC ............ *H04N 1/32144* (2013.01); *G06F 21/10* (2013.01); *G06F 21/16* (2013.01); *G06T 1/005* (2013.01); *G06T 1/0042* (2013.01); *G06T 11/60* (2013.01); *H04N 1/32272* (2013.01); *G06F 2221/0746* (2013.01); *G06F 2221/0748* (2013.01); *G06T 2201/0061* (2013.01); *G06T 2201/0063* (2013.01); *G06T 2201/0064* (2013.01); *H04N 2201/327* (2013.01); *H04N 2201/3238* (2013.01)

(58) Field of Classification Search
USPC ......... 382/100, 103, 106, 112–116, 155, 162, 382/168, 173, 181, 219, 232–234, 254, 274, 382/276, 292, 305, 312; 455/556.1, 418; 713/189
See application file for complete search history.

(56) References Cited

U.S. PATENT DOCUMENTS

| | | | |
|---|---|---|---|
| 7,584,361 | B2 | 9/2009 | Tapson |
| 2003/0028801 | A1 | 2/2003 | Liberman et al. |
| 2011/0143811 | A1* | 6/2011 | Rodriguez ................. 455/556.1 |
| 2011/0244919 | A1* | 10/2011 | Aller et al. ................. 455/556.1 |
| 2012/0317421 | A1* | 12/2012 | Gounares ..................... 713/189 |
| 2013/0152174 | A1 | 6/2013 | Raley et al. |
| 2013/0183952 | A1* | 7/2013 | Davis et al. .................. 455/418 |

OTHER PUBLICATIONS

International Search Report and Written Opinion in corresponding Application No. PCT/US15/12682, dated Apr. 16, 2015, pp. 1-11.

* cited by examiner

*Primary Examiner* — Seyed Azarian
(74) *Attorney, Agent, or Firm* — Fish & Richardson P.C.

(57) ABSTRACT

Among other things, at a cloud-based service, digital image files are received from which digital images can be displayed on devices. For each of the digital image files, data is embedded in the digital image file on behalf of a party who has rights in the digital image file. The existence of the embedded data is not perceptible in any digital image that is displayed using the digital image file. The embedded data includes information from which the digital image file can be authenticated. At the cloud-based service, a digital image file is received that is to be authenticated. The digital image file is authenticated based on the embedded data.

37 Claims, 3 Drawing Sheets

USING A SECURITY FEATURE WITH A DIGITAL IMAGE FILE

BACKGROUND

Figure 1:
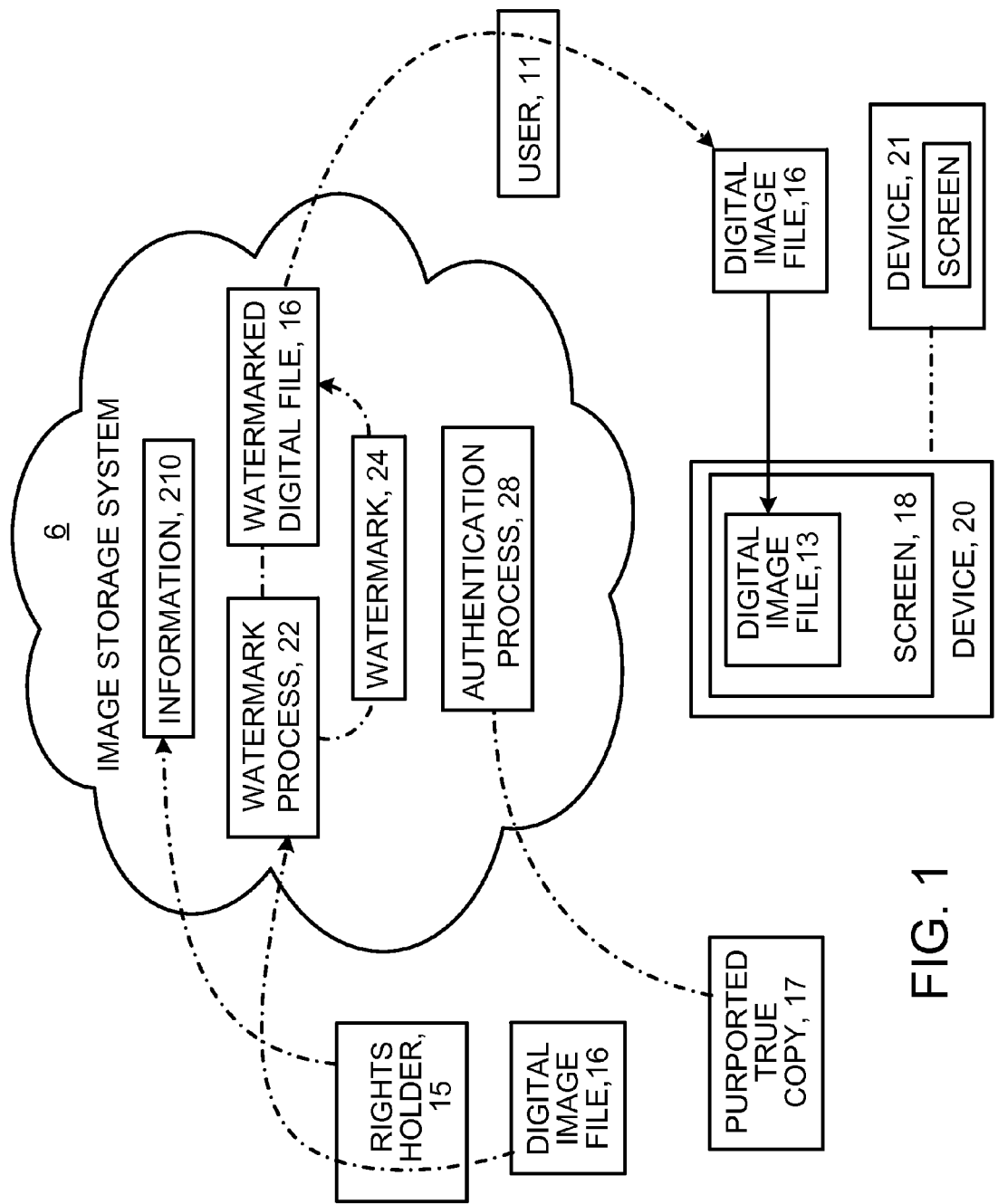

This description relates to using a security feature with a digital image file.

An invisible or imperceptible watermark, for example, is a security feature that can be used to embed data into the digital image file, without the data being visible to the naked eye when the digital image is displayed. Invisible watermarks typically cannot be cropped or otherwise edited out of the digital image or the digital image file. If a watermarked image or digital image file is subjected to tampering, the watermark either remains with enough fidelity to identify the digital image file or the image quality is so debased that the digital image file is essentially destroyed. Known steganography processes can be used to implement invisible watermarks, for example, using software that can be installed on a workstation or other user device. Third party services also provide watermarking of digital image files for users.

A user who wants to make a digital image file available online, for example, to market the image, may be concerned that the file will be stolen or copied or used by others without the user's authorization. By applying an invisible watermark or having a third party apply the watermark before the user uploads the image, the user may be able to dissuade others from stealing or misusing the digital image file, without noticeably degrading the quality of the image. Once the image file has been uploaded to a marketing site by the user, services may be available that track online occurrences of the image on behalf of the user.

SUMMARY

The following explanations may be helpful in understanding the terminology used in the following description.

Embedded data—data included in a digital watermark that is applied to a digital image file.

Key or identifier—an element of embedded data that can be used to look up other information in a database.

Unique key or unique identifier—a key or identifier that is uniquely associated with image data to be looked up in the database.

Hash—a kind of unique key or identifier that is not easy (and may be very hard) to figure out without using the hashing function associated with the hash.

Image data—data about an image, such as the name of the work, that is stored in a database and can be retrieved from the database using the unique key or unique identifier.

Watermark—something that is put on or in an image to alter it so that it is hard to copy the image without either also copying the watermark or destroying the image for practical purposes. A watermark is a kind of security feature.

Digital watermark—a watermark that is embedded in a digital image file in digital form. A digital watermark can include any kind of embedded data, for example, a unique key or a hash. The hash can be derived from the digital image file by applying a hashing function to the digital image file.

Invisible watermark—roughly speaking, a watermark that is not visible to a viewer of the image.

Limited edition of a digital image file—A set of "instances" of the digital image file that all produce displayed digital images that look the same to a human viewer; however, each of the instances of a limited edition is different from every other instance of the limited edition, because it is identified by and has embedded in a digital watermark of the digital image file, a unique key, for example, a unique hash. Therefore each instance of a limited edition can be distinguished uniquely from each other instance of the limited edition.

Cloud-based—hosted on the Internet, for example, an application (or a process) that is hosted on the Internet. A user of the cloud-based application or process need have only a digital image file, an Internet connection (and, for example, credentials to log into the application) to make use of the functions and features of the application or process. The application or the process is completely abstracted from the point of view of the user and the client devices used by the user.

In general, in an aspect, at a cloud-based service, digital image files are received from which digital images can be displayed on devices. For each of the digital image files, data (e.g., a unique identifier or unique key or hash) is embedded in the digital image file on behalf of a party who has rights in the digital image file. The existence of the embedded data is not perceptible in any digital image that is displayed using the digital image file. The embedded data includes information that can be used in a process of authenticating the digital image file. At the cloud-based service, a digital image file is received that is to be authenticated. The digital image file is authenticated in a process that uses the embedded data.

Implementations may include one or a combination of any two or more of the following features. The embedded data comprises a hash of data in the digital image file. The embedded data can be used (e.g., as a database key) to locate information about the digital image file that has been stored at the cloud-based system. Information is stored at the cloud-based system about the digital image file and can be retrieved based on the embedded data. Each of the digital image files is received through a publicly accessible communication network. There is a limited edition that includes one or more instances of the digital image file. The embedded data (e.g., a hash) for each of the instances of the digital image file is uniquely associated with that instance of the limited edition. The embedded data includes a key or identifier (and in some cases includes only the key or identifier) to information (e.g., image data) about the instance of the digital image file; the image data is stored at the cloud-based service, separately from the digital image file. The information about the instance of the digital image file includes at least one of: an identification of a party who has rights in the instance of the digital image file, an identification of the edition to which the instance belongs, and an identification of an instance of the digital image file that is included in the limited edition.

After the digital image file has been authenticated, information is provided to a user. The information provided to the user is determined by characteristics of the user. The information provided to the user includes the result of the authenticating. The information provided to the user may also include an identification of a party who has rights in the digital image file.

After the data has been embedded in the digital image file, information is provided to a user. The information provided to the user can include image data associated with the unique identifier of the instance of the digital image file, such as the digital image file, its instance number within a limited edition, or its limited edition number. The information provided to the user includes confirmation that the data has been embedded. The instances of the digital image files are stored at the cloud-based service. The instances of the digital image files are received from a web browser or a mobile app of a user device. Information is received that defines instances of a limited edition of the digital image file. An image storage system is provided for distribution of instances of the digital image files subject to conditions specified on behalf of a party who has rights in the digital image file and agreed to by a user. An instance of the digital image file is delivered to the user who has agreed to the conditions. The user can display a digital image based on the instance of the digital image file. The embedded data comprises a digital watermark.

In general, in an aspect, from a cloud-based service, an instance of a digital image file is delivered to a user device in which data (e.g., a digital watermark) has been embedded at the cloud-based service on behalf of a party who has rights in the digital image file. The delivery of the instance of the digital image file containing the embedded data to the user is controlled in compliance with conditions that have been specified on behalf of the party who has rights in the digital image file. A digital image can be displayed on a user device based on the instance of the digital image file.

Implementations may include one or a combination of any two or more of the following features. The instance of the digital image file is delivered through a web browser or a mobile app. The user device includes a device that includes a screen and a processor that can display the digital image using the instance of the digital image file. The instance of the digital image file includes one instance among one or more instances of a limited edition of the digital image file. The embedding of data (e.g., the digital watermarking) of the digital image file at the cloud-based service includes associating a unique identifier or key with a single instance of a limited edition of the digital image file. The user device on which the display occurs comprises a mobile phone, TV, monitor, projector, or any other screen or display device.

In general, in an aspect, at a user device, an instance of a digital image file is received from a cloud-based service. The digital image file has had data embedded in it (e.g., has been digitally watermarked) at the cloud-based service to protect rights of a user in the digital image file. The digital image file is received only on the basis of an agreement by a user to conditions for use of the digital image file. A digital image is displayed using the instance of the digital image file.

Implementations may include one or a combination of any two or more of the following features. The digital image is displayed on a user device. The user device on which the digital image is displayed is the user device that received the instance of the digital image file. The user device on which the digital image is displayed is a device that is accessible to the user device that received the instance of the digital image file The user device includes a wireless cellular device or a device that has access through the Internet to the cloud-based service. The digital watermark of the digital image file is not visible in the digital image. The instance is an instance of a limited edition of the digital image file.

In general, in an aspect, a cloud-based service includes cloud-based servers to provide storage service for digital image files and information (e.g., image data) about digital image files received from users. Processes run on the servers to embed data (e.g., a hash) in the digital image files to protect rights of parties in the digital image files. Authentication processes run on the servers to authenticate digital image files received from users. The authentication processes are related to the data embedding processes.

Implementations may include one or a combination of any two or more of the following features. Distribution processes are run on the servers to distribute instances of the digital image files to users. Control processes control distribution of instances of the digital image files to users based on conditions imposed for the benefit of parties who have rights in the digital image files.

In general, in an aspect, at a cloud-based server, data of a digital image file is used to create a unique identifier (e.g., a hash) for the file. The unique identifier is embedded in the file. The unique identifier is retrieved from the file. The unique identifier is used to locate information about the digital information file that is stored at the cloud-based server.

These and other aspects, features, implementations, and advantages can be expressed as methods, methods of doing business, program products, software, systems, components, databases, data structures, and in other ways.

These and other aspects, features, implementations, and advantages will become apparent from the following description, and from the claims.

DESCRIPTION

Figure 2:
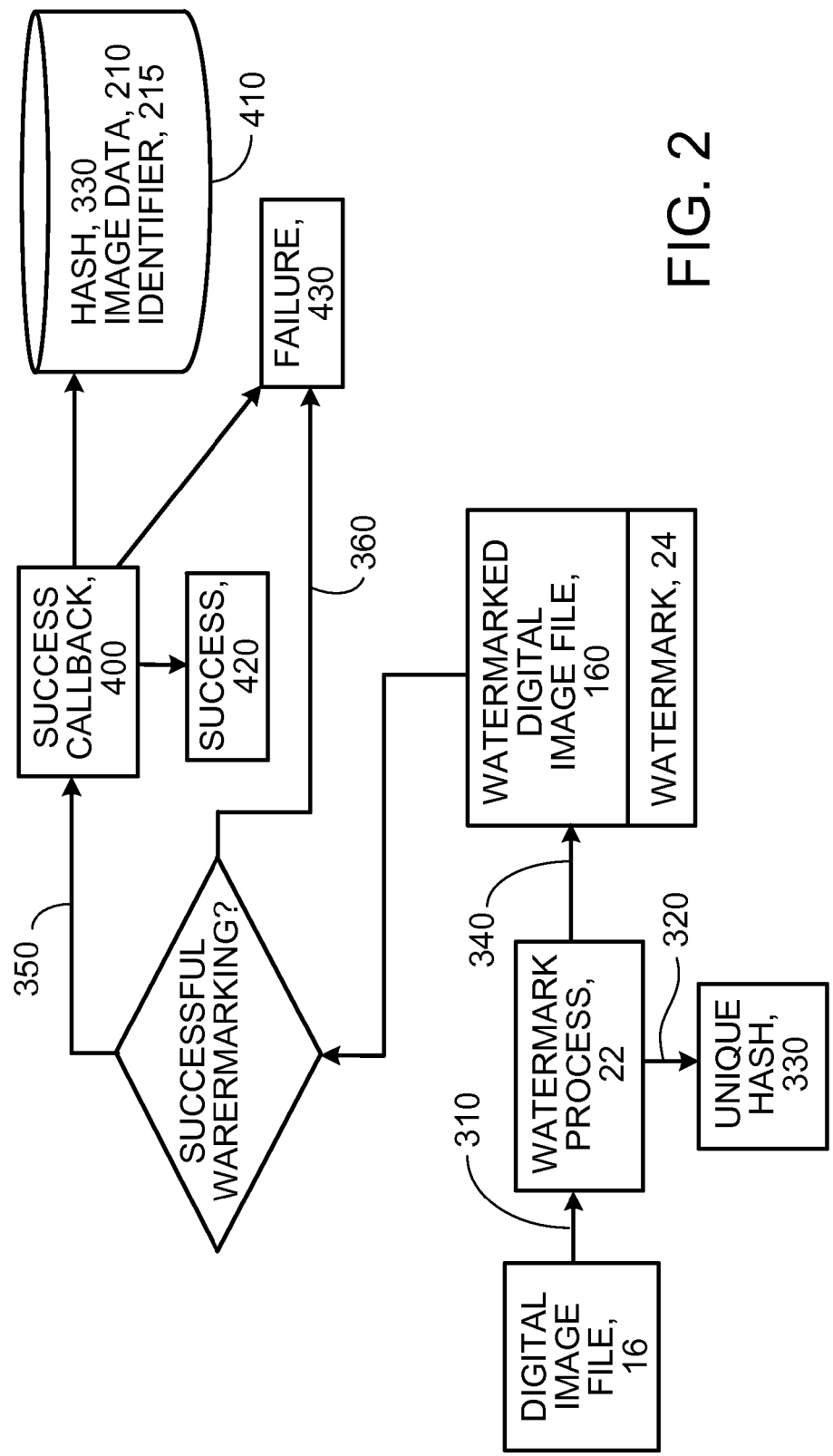
Figure 3:
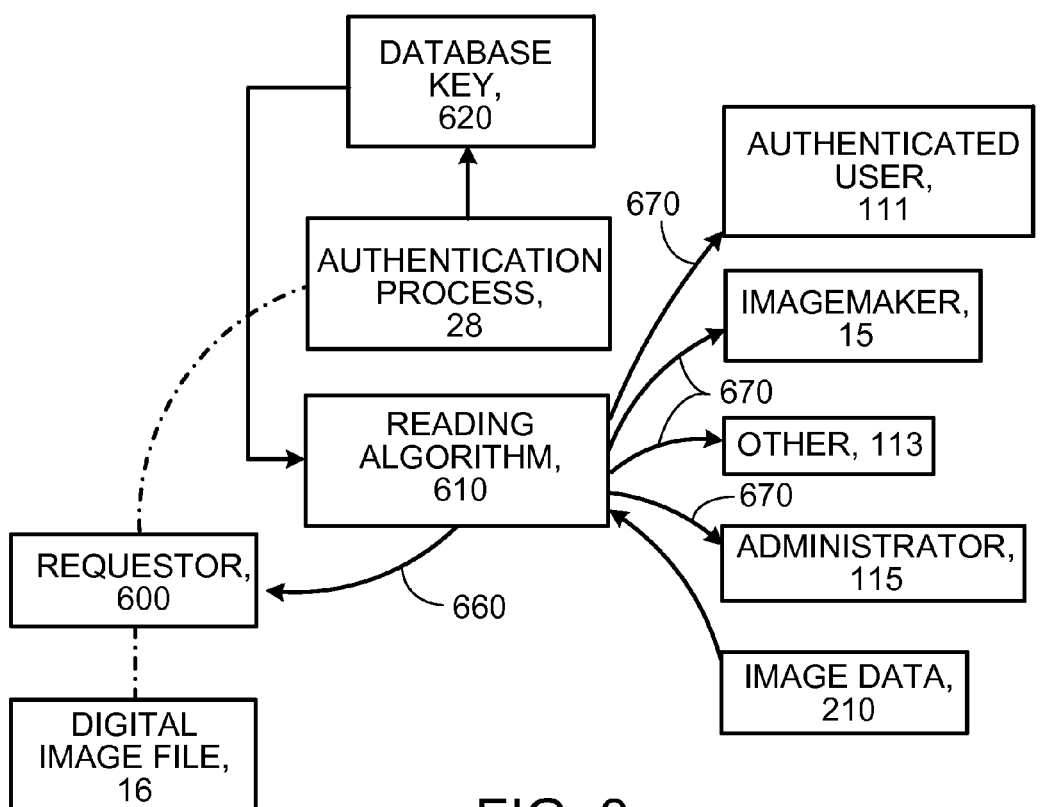

FIGS. 1 through 3 are block diagrams.

As shown in FIG. 1, here we describe, among other things, a cloud-based online image storage system 10. An image maker 15 (or image source or other client or party who holds rights in a digital image) can use the cloud-based image storage system 10 to offer for sale or rent, or otherwise market or distribute, to one or more users 11 (or customer or other party) a right to have access to and, for example, display a digital image 13 (of, for example, an original work of art). In some cases, the right that is being marketed is a right that allows the user 11 to acquire (for example, by downloading from the image storage system) an instance of a digital image file 16 (e.g., an instance of a limited edition). Using the instance, the digital image 13 can be displayed on any screen 18 of any device 20 (handheld, workstation, mobile, wireless, or any other kind) to which the user has access (or a device accessible to device 20).

The right that is acquired by the user can be a right to display the digital image on any screen of, or to print the digital image on, any device 20 or device 21, even if the device on which the image is displayed or printed is not the device to which the digital image file was downloaded from the image storage system. For example, the device 20 could be a smart phone with an appropriate app running on it or a computer with an application running on it that can display or print the digital image on another device 21. For example, the other device 21 could be an HDTV that is controlled by device 20. The control of the other device 21 by the first device 20 could be through a wired connection or a wireless connection or could be through the cloud, for example.

Therefore, in some implementations, the cloud-based image storage system performs the processing and authentication in a role as a server, and one or more devices 20 operate in a role as a client to the cloud-based server (or servers). In some cases, once the image storage system sends the instance of the digital image file to the user, the digital image file can be displayed or printed on other devices.

Unlike some conventional digital watermarking systems—in which a user implements and stores everything on the client side and then can decide to upload to the Internet once the processing has been done—in some implementations of the system that we describe here, the processes of both digital watermarking and storing the digital image file are automated from the viewpoint of the client (minimizing error).

In some implementations, a cloud-based digital watermarking process 22 running on servers that are part of the image storage system 10 securely generates and embeds data (e.g., a digital watermark 24 such as a hash or other unique key) in the digital image file 16 that represents the digital image 13 so that an instance of a digital image file 17 that purports to be an authentic instance of the original digital image file 16 (the one associated with the rights holder 15) always may be authenticated based on the digital watermark (by an authentication process 29 running on servers of the image storage system 10) as being (or not being) an authentic instance of the original digital image file.

In addition, if an instance of the digital image file 17 is authenticated but its embedded data associates it with a user other than the party who has presented it to the digital storage system for authentication (or in some other way has attempted to use it through the image storage system), then it is possible to track the usage by the presenting user, on behalf of the user with whom the embedded data is associated. If the instance of the digital image file 17 is a non-authentic instance, the image storage system only establishes that the digital image file is not authentic and therefore has no value.

We use the term "digital image" to refer, for example, to an image that is formed of pixels on a display and can be visually perceived. The pixels of a digital image 13 are stored as bytes of digital data in the digital image file 16. The format and organization of the digital data is determined by the file format of the digital image file 16 (e.g., jpeg, bmp, png, gif, tif, mov). We use the term digital image broadly to include, for example, any static digital image or any individual frame or set of frames of a video. In general, the digital watermarking process that we describe can be applied to any existing digital image file in any existing file format that is susceptible to digital watermarking.

To the extent that a digital watermark can be applied to a movie file in a format such as .mov (or to the extent that such a facility becomes available in the future), a user of the image storage system could have that digital watermarking applied by the image storage system. The image storage system will allow for such digital watermarking and technology exists to support it.

The rights holder 15 can be any person, entity, or system that has rights in the digital image file. The uploading of the digital image file can be done by the rights holder 15 or can be done by another party, for example, on behalf of the rights holder. In some implementations, the rights holder 15 is an image maker (that is, a party who has created a digital image, for example, an artist who works in digital media). In some cases, the rights holder 15 need not be the creator of the digital image, but can be a party who has acquired or controls rights in the digital image file.

Generally, as suggested earlier, we refer to a digital watermark broadly to include, for example, information that has been embedded in an instance of a digital image file in such a way that it is not seen by a user who is viewing the digital image. The digital watermark (e.g., hash or other unique key) is embedded within the instance of the digital image file in such a way that it cannot be removed or altered without effectively destroying the ability to use the file to view the digital image. The embedded data (for example, a unique key to information that is stored separately in a database under control of the host of the image storage system) is useful in authenticating and tracking the image, among other things. For example, the digital watermark can be used as a key for fetching information from a database about the image maker or source or rights holder. The information stored in the database can include information that that identifies a user as the party who is authorized to view the digital image.

The digital watermark (e.g., the hash) can be recovered from an authentic instance of the digital image file, and the recovered hash or other unique key can be used to such information that will enable a determination that the digital image file or instance is authentic, for example, that it is known to have been digitally watermarked by the image storage system and represents exactly the instance of the digital image file of the rights holder.

An authentic instance of the digital image file may only be used legally by the authorized user who has acquired the right to view the digital image. Because the image storage system also knows the identity of the authorized party, the image storage system can determine either that the authorized party was the party who presented the digital image file for authentication or can track the use by any other (e.g., unauthorized) party who presented the instance of the digital image file for authentication (or for any other purpose to the image storage system).

In other words, the information carried by the digital watermark can be used to confirm that the instance of the digital image file was one that had been digitally watermarked by the image storage system, and to determine other facts about the instance of the digital image file, such as whether the party who presented it for authentication had the authority to possess it. The image storage system therefore can, among a wide variety of other services, provide assurances to the rights holder that the system can always, on behalf of the rights holder, (a) confirm whether an instance of a digital image file of the rights holder that is presented to the system by any party is authentic, (b) if the instance of the digital image file is not authentic (that is, the instance is unauthorized even if the digital image that it produces appears superficially to be the image that would be produced by the authenticated file), capture at least some information about the party who presented it, and (c) if the instance of the digital image file is authentic, determine whether the party who presented it is an authorized party for that file, and if not, capture at least some information about the party who presented it (in other words, track it).

Therefore, because there are to be agreements and licenses that define whether a party who has possession of or uses or distributes or copies an instance of a digital image file has done so legally, it is possible to determine the propriety of an instance of a digital image file that produces a digital image that looks like one that has been processed by the system. For example, the image storage system may be able to determine if the instance of the digital image file is either (a) an illegal instance (because it does not bear the digital watermark), (b) a legitimate instance (that does bear the digital watermark) but has been used illegally beyond the terms of the license (depending on where it was located and who had possession of it) or (c) a legitimate instance that is being used legitimately.

The portion of the digital watermark that is embedded in the instance of the digital image file may be nothing more than a piece of data that is a unique identifier in the form of a hash of at least some of the data (e.g., all) of the digital image file itself. As mentioned, that hash can also serve as a key into a database of information stored in the cloud-based server. Each record of the database can include a wide variety of information about the image. As noted earlier, we sometimes refer to the information that is embedded in the digital image file simply as embedded data. We also sometimes refer to it as a digital watermark or as a unique key or a unique identifier or a hash.

The host of the cloud-based system that we describe here controls the hashing algorithm (for example, the algorithm that generates the data, hash or other unique key, that is to be embedded in the digital image file); someone who wants to authenticate that an instance of a digital image file is one that had been digitally watermarked by the system, or who wants to learn information that is contained in (or pointed to by the digital watermark may have the hash looked up and used to locate the corresponding data (for example, stored separately in the database).

In general, a digital watermark can only carry a limited amount of data. So, by embedding only a hash (for example, a 10 digit number—allowing for 10 billion unique identifiers) in the digital image file, the amount of data added to the digital image file need be no more than 4 bytes, yet that hash can point (as a unique key to the database) to an essay's worth of multibytes (e.g., 1 MB) of information about that instance of the digital image file.

The rights holder may wish to market the instances of the digital image file 16 (e.g., to a user 11) that belong to one or more limited editions through the online image storage system 10. In some cases, the rights holder 15 may wish to market, sell, or license instances of the digital image file 16 through any of a wide variety of other digital distribution media (e.g., over the Internet directly to a buyer, on a CD or DVD, or in other ways).

Examples of a rights holder or other client 15 (we sometimes use the terms rights holder and client interchangeably) include: a photographer who wants to sell an instance of a digital image to a press outlet through an online portal; an image provider service that wants to license and instance of a digital image that it owns (but did not itself create as original artwork) for commercial or private use of a buyer; an individual who wants to protect and instance of a digital image he put on the Internet but is not offering for sale; a steganography purveyor, that is, an entity in the business of charging for the service of providing steganographic security for instances of a digital image; a photographer who wishes to sell an instance of a digital image to press or other outlets; or a commercial site (e.g., a social network site) that wants to prevent unauthorized use of instances of digital images that appear on the site.

In some cases, the client 15 of the image storage system 10 may want to ensure that instances of the digital image file 16 to be uploaded 17 and marketed always can be authenticated, that is, identified in the hands of any other party as instances of the digital image file that originated from the client 15. For example, suppose the client 15 and a user 11 (e.g., a potential purchaser) want to arrange a sale or license of a digital image file 16. The user 11 may be given access to an instance of the digital image file 16 before purchasing it. If the instance of the digital image file 16 were not identifiable as the one that originated with the client in a way that could not be altered or removed from the instance of the digital image file, the user 11 (say a press outlet) could steal the instance of the digital image file 16 and use or distribute copies of it without the permission of the client 15.

In some cases, for this purpose, as discussed, a digital watermark 24 can be embedded in instances of the digital image file 16 provided by the client. The digital watermark 24 can be a unique identifier or unique to your hash associated with an instance of the uploaded 19 digital image file and can be unalterable, that is, can be in a form that cannot be removed from the instance of the digital image file or altered within the instance of the digital image file without materially altering or degrading the instances of the digital image that can be produced from the file. In addition, the digital watermark can be invisible, that is, not apparent to a viewer of the digital image. In some cases, the embedding of the data involves making changes to some of the pixel values in the digital image file, which has the effect of changing the digital image that is produced by the instance of the digital image file; but the changes to the digital image are so subtle as to be invisible to the naked eye.

The distribution structure by which instances of an instance of a digital image file can be made available to users 11, and the terms and conditions that govern what a user can do with an instance of a digital image file that it has acquired, can be determined and specified by the rights holder 15. In some cases, when the rights holder 15 uploads 19 the digital image file 16 to the image storage system 10, the rights holder will authorize the sale or licensing of only a single instance of the digital image file to a single user. In some cases, the rights holder can authorize the distribution of one or more instances of one or more limited editions) each including a number of instances of a single digital image file.

When a limited edition is authorized, a specified limited number of instances of the digital image file may be distributed by the image storage system 10 to users. Two or more limited editions of instances of a digital image file may also be authorized.

As discussed earlier, a user who acquires the right to view an instance of a digital image file can technically make a copy of the instance of the digital image file. But, in general, the image storage system helps to limit the ability of such a user to share the copies and therefore renders the value of such a copy only intrinsic. The unauthorized copy could not be successfully sold for profit to a buyer, because the unauthorized copy cannot not authenticated as belonging to the buyer and therefore, the value in the buyer's hands would be its intrinsic value only.

In connection with the digital watermarking process, a unique identifier (hash, unique key) is generated for each instance in each limited edition. Although the identifiers are unique for every different instance, some of the data to which two or more of the identifiers point can be similar. For example, hash 1234 could point to instance 1/2 in a limited edition of two instances of "Water Lilies—Setting Sun", the one owned by Tom Cruise, while hash 5678 could point to instance 2/2 of "Water Lilies—Setting Sun" in the same edition, the one owned by Nicole Kidman. However, much of the information to which the hash points in the database for the two instances of that edition point can be the same (such as the title of the work).

If only a single instance of a digital image file has been authorized in a limited edition or outside of an edition, that instance will receive its own unique identifier. If a rights holder uploads a number of different digital image files for different works, other than as part of one or more editions, each of the different digital image files will receive its own unique identifier.

In some implementations, the digital watermark 24 can be created by the watermarking process 22 once the digital image file 16 has been uploaded 17 to the cloud-based image storage system 10.

The digital watermark 24 is associated with information that is useful or necessary for authentication and tracking of the instance of the digital image file and possibly for other purposes. At least some of the information can be related to the client 15 (e.g., an image maker), to the instance of the digital image file 16, or to a transaction associated with the instance of the digital image file 16, or combinations of two or more of those. The digital watermark 24 may be associated with information related to the name of the client 15, the provenance of the digital image file 16, the instance number and edition number of the digital image file 16, how many instances of the digital image file 16 are authorized at a given time, and digital image file 16 copyright information.

When an instance of the digital image file 16 is sold, licensed, or otherwise involved in a transaction, (e.g., between the client 15 and a purchaser), the digital watermark

24 can be associated with additional information (stored in the database) related to the transaction, such as the name of the purchaser (e.g., the user 11) and the date of the transaction. The stored information pointed to by the digital watermark 24 may also provide a way for the client 15 to track instances of the digital image file 16.

We use the term "track" broadly to include, for example, determining, for an instance of a digital image file that produces a digital image that looks like one that was handled by the image storage system and is in possession of a party, (1) whether the instance of the digital image file is authentic, (2) if not, at least some information about the party in possession, and (3) if authentic, whether the party in possession had the legal right to possess that instance.

Tracking could be triggered in a variety of different ways. One way would be to continually search the Internet for digital images and then confirm that the related digital image files are not being used or disseminated illegally. Another would be to check digital image files for digital images that are observed as looking like ones managed by the image storage system.

Therefore tracking can be continual, such as running continual queries, and some can be situational, e.g., seeing something that looks suspicious or similar to a digital image managed by the image storage system, or, for a client, one of their digital images. The digital image file for the digital image then can be authenticated and tracked.

Although specific examples of information that the invisible digital watermark 24 can include were given above, these examples are not exhaustive.

Some of the information 210 related to the digital image file 16 that is to be included in the digital watermark (e.g., the hash and the information stored in the database) can be uploaded by the client or entered through a Web browser interface. The information could include, for example, the name of the client 15, the provenance of the digital image file 16, the instance number and edition number of the instance of the digital image file 16, how many instances of the digital image file 16 are authorized at a given time, and digital image file 16 copyright information.

If the digital image file 16 was involved in a prior transaction, (e.g., between the client 15 and a purchaser), the image data 210 can include information related to the transaction, such as the name of the purchaser (e.g., the user 11) and the date of the transaction. When the digital image file 16 is uploaded, the cloud-based application 22 initiates a watermarking process 220, described in more detail below, to create an instance of the digital image file 16 that includes a digital watermark 24 (e.g., a unique key to stored information).

Referring to FIG. 2, in some implementations, in order to create the digital watermark, the cloud-based process 22 reads 310 the data that constitutes the digital image file 16 and applies the hashing algorithm to generate 320 a unique hash 330 based on the data of the digital image. The unique hash 330 is unique for every uploaded digital image file 16 and for every instance of it that is authorized to be provided to a user, whether part of a limited edition or not.

The hash can be created using a variety of hashing algorithms. For example, the hash can be a unique string of numbers and letters that has an infinitesimal possibility of being re-created from the same digital image, for example 123423Dec20131131PM. Even if 1234 is generated at a later time it will no longer be 11:31 PM on 23 Dec. 2013. An existing example is the SHA-2 hash function which is implemented in OpenSSL and has an extremely low likelihood of collision (creating two identical hashes from two different data sets) or the SHA-3 hash that is said to be collision proof but is not part of OpenSSL and may create hashes that are too long for use with Digimarc. In general a SHA-2 might look like this: "d7a8fbb307d7809469ca9abcb0082e4f8d5651e46d3cdb7 62d02dObf37c9e592" and a SHA-3 might look like this: "4d741b6f1eb29cb2a9b9911c82f56fa8d73b04959d3d9d22 2895df6c0b28aa15"

Once the unique hash for an instance of a digital image file has been generated, the cloud-based watermarking process 22 can embed 340 the unique hash 330 in the digital image file 16 to create a watermarked instance 160 of the digital image file 16 containing an embedded invisible digital watermark 24. A third-party steganographic process can be used to embed the digital watermark 24 into the digital image file 16. In the process of embedding, the data of the digital image file is changed to reflect that the hash has been embedded into it. Some steganography tools will embed the hash once. Others will embed in multiple places throughout the digital image file in ways that are more resistant to manipulation. The image is changed imperceptibly as a result of the embedding.

Although we have referred to creating and embedding a hash in the instance of the digital image file as part of the digital watermark, any other kind of unique identifier created in any fashion could be used and embedded in the digital image file and used as a value from which information about the digital image file can be located or identified in storage in the cloud-based system. We sometimes use the phrase embedded data to refer to any kind of unique identifier that is embedded into the instance of the digital image file. The embedded data can then be used to find the other information stored in the cloud-based system. In some implementations the embedded data is a unique key into a database. But other implementations would also be possible for storage of the additional information.

The digitally watermarked instance of the digital image file can then be used, just as the original digital image file could be used, to display the digital image of the work. The digital watermark will be invisible to the user. However, the digital watermarking can be detected in the data bytes of the digitally watermarked digital image file and cannot be altered or stripped from the digital image file without altering the digital image that is displayed using the tampered instance of the digital image file.

The cloud-based watermarking process 22 can determine whether the watermarking process 22 was successful 350 or unsuccessful 360. A failure could be caused, for example, by a read or write error on the computer or during the request-response cycle of the upload. A failure would mean that a readable watermark had not successfully been created. If the watermarking process 22 is successful 350, the cloud based watermarking process 22 can send the hash 330 (or other unique identifier or key) and the digital image file 16 embedded with the digital watermark 24 to a success callback routine (400 in FIG. 4). If the watermarking process 220 is unsuccessful 360, the cloud based application 22 can return a failure message 430 to the client 15.

The success callback routine 400 can attempt to save the unique hash 330 in a database 410 (maintained by the servers of the cloud-based image storage system 10) along with image data 210, for example, the edition number, the identity of the rights holder, and the identity of the artist associated with the instance of the digital image file 16 so that a relatively short unique identifier 215 (the unique hash or other unique key) can then be used as a pointer to represent a much larger body of information (the image-related data stored elsewhere).

If the unique hash 330 (or other unique identifier or key) and the image data 210 have been successfully saved to the database 410, the digital image file 16 embedded with the invisible digital watermark 24 is saved to the database 410, and a success response 420 is sent to the client 15. Up to this point, the instance of the digital image file 16 embedded with the invisible digital watermark 24 only exists in memory of the servers. This prevents a copy of the digital image file 16 from being stored without having its associated unique hash 330 and image data 210 in place in the database. If the process to save the information to the database does not succeed, a failure response 430 is returned to the client 15, and the transaction is rolled back to a previous point (e.g., the client 15 may be instructed to upload the digital image file 16 and the image data 210 again).

As discussed earlier, in some cases, a digital image file 13 can be sold as multiple instances of a limited digital edition. When a user 11 purchases a right to use an instance of a limited edition of a digital image file 16, the user 11 then owns a license to the instance of the digital image file 16, that is, a right to view the digital image produced by the instance of the digital image file 16 for a specific period of time on any device. The duration of the right to view could range from, say, a day or a week, to perpetually, or broadly to any period in a range from 0 to infinity. In some examples, the length of time would be one month.

As shown in FIG. 3, once the digital image file has been watermarked and the unique hash and image data have been stored in the database of the image storage system 10, any party who is interested, such as the rights owner or a potential buyer (we sometimes refer to such a party as a requestor 600) can upload an instance of the digital image file 16 to the image storage system 10 to be authenticated. The uploaded instance of the digital image file 16 may or may not have an embedded digital watermark 24. The cloud based authentication process 28 can include a digital watermark reading algorithm 610. The same process used to create the digital watermark typically can be used to read the digital watermark. For example, the process of verifying the success of the embedding of the watermark, described earlier, is predicated on the ability to read to the embedded watermark. The data read from the digital watermark 24 of the instance of the digital image file produces a database key 620 that is a key into the database stored in the servers and is associated with the invisible digital watermark 24. The database key 620 can be, for example, the identifier 215 of FIG. 2. In the database, the key 620 is associated with image data 210, assuming that the database includes a record for which the key value is the same as the key value obtained from the uploaded instance of the digital image file.

If the digital watermark reading algorithm 610 detects that the instance of the digital image file 16 does not have an embedded digital watermark 24, or if the digital watermark reading algorithm 610 is unable to read the embedded digital watermark 24, the algorithm can return a failure response 660 to the requestor 600 indicating that it is not possible to confirm the authenticity of the uploaded file. If the digital watermark reading algorithm 610 detects that the instance of the digital image file 16 has an embedded digital watermark 24 and is able to read the invisible digital watermark 24 and obtain a database key 620 associated with the digital watermark 24, the cloud based authentication process 22 can use the database key 620 to obtain the image data 210 that is stored in the database 410 and is associated with the digital image file. The cloud based authentication process 28 then can determine if the instance of the digital image file 16 is authentic and perform other processes such as tracking.

In some implementations, the requestor 600 can be a user 11 who has legally purchased or licensed an instance of a digital image file 16 and has the right to display the corresponding digital image. In some implementations, the requestor 600 can be a client 15 (e.g., the image maker). In some implementations, the requestor 600 can be anyone in possession of an instance of a digital image file 16. In some implementations, the requestor 600 can be a system administrator. The identity of the requestor 600 can determine what information from the image data in the database, if any, is sent to the requestor 600 in a verification (e.g., authentication) response 670.

In some implementations, if the requestor 600 is an authenticated user 111, the cloud based authentication process 28 can return all image data 210 associated with the digital image file 16 in the verification response 670.

In some implementations, the cloud based authentication process 22 returns less than all of the image data 210 associated with the instance of the digital image file 16 in the verification response 670.

In some implementations, if the requestor 600 is the image maker, the cloud based authentication process 22 can return all image data 210 associated with the instance of the digital image file 16 in the verification response 670.

In some implementations, if the requestor 600 is someone 113 other than an authenticated user 11 or the image maker, the cloud based authentication process 28 can return less than all of the image data 210 associated with the instance of the digital image file 16 in the verification response 670.

In some implementations, the cloud based authentication process 28 may return information to the requestor 600 only about the authenticity of the instance of the digital image file 16 in the verification response 670.

If the requestor is not an authenticated user, a notification can be issued to the host of the image storage system or to the rights holder as this may indicate illicit ownership or use of an image with a digital watermark.

If a potential buyer or third party wants to test an instance of a digital image file, the third party can submit the file to the image storage system for authentication and in return receive a simple yes or no response.

In some implementations, if the requestor 600 is a system administrator 115, the cloud based authentication process 28 can return all image data 210 associated with the instance of the digital image file 16 in the verification response 670.

For example, a regular user may receive information noting that the digital image is copyrighted while a system administrator might receive detailed information about the edition, provenance, and creator of the instance of the digital image file. A user 11 may be authenticated by logging into the cloud based authentication process 22 and entering a password.

The system and techniques that we have described here will provide rights holders and other clients with a simpler, easier, lower cost, more effective way to embed invisible watermarks in their digital image files and to identify and track their digital image files on the Internet to protect their rights. The image storage system can operate in the cloud, a mode of image use that is becoming more and more popular and can store copyrighted and edition-based instances of digital image files securely online.

As we have explained, among functions performed by implementations of the cloud-based processes are the following:

1. Embedding an invisible digital watermark into an uploaded digital image file in response to the click of a button by a user through a web-based cloud application.

2. Storing data about the image in secure databases on servers controlled by the host of the processes.

3. Allowing the digital watermark to be identified and matched with stored image data, for example, to authenticate the image using the digital watermark (e.g., the hash) as the data key and to perform other processes using the image data found in the database.

4. Allowing for digital image files for images found on the Internet or that have been digitally disseminated to be uploaded and verified (authenticated) against the cloud-based system's database of existing digital watermarks.

5. Enabling a third party to scan the Internet and send instances of digital image files for verification (authentication).

Thus, the cloud-based system that we have described can embed digital watermarks using a cloud-based service that marks those images with data about the image, data that is invisible to the naked eye and nearly impossible to remove from the image without destroying the image. Watermarks can be added to any digital image files that are expressed in formats such as a jpeg, png, gif, and others, enabling parties to track the files if they are disseminated digitally.

The cloud-based digital watermarking and authentication processes are part of a cloud-based image storage system that can serve as a platform for digital art that enables artists to upload digital works of art in still, gif, video, or other digital media formats to sell to users so that users may display those works of art on any screen they own (any commercially available screen, tablet, computer, or device with a screen) or on screens created and sold specifically for the purpose. As steganography and digital watermarking technology and services become available for video files, the same processes can be used and the same advantages achieved.

Protecting the digital image files on the cloud-based platform is important. Because the instances of digital image files are sold in limited digital editions, it is useful to embed data into the digital image files that allows the platform (by using the embedded key to fetch image data stored in a database) to determine who created the images, what limited edition they belong to, how many instances of the edition were authorized at one time, and a wide variety of other information. Knowing this will enable the platform to determine whether or not images of digital works are being used and disseminated illegally, for example. This protects the artists' creations and the values of the works to the buyers.

These cloud-based processes are useful to all creators of digital images who want to protect and track digital image files in the digital space. Current providers of steganography technologies can also use the processes to provide their users with a seamless cloud-based facility to implement a digital watermark and disseminate, authenticate, and track digitally watermarked images. Creators or digital watermarking service providers can access the cloud-based processes using the web or a mobile application. Enabling users to mark digital image files of their creation so that those digital image files may be identified as their work and tracked if they are disseminated legally or illegally through the Internet or other digital means allows digital image creators to more easily and seamlessly protect their intellectual property and identify if that intellectual property has been used or disseminated without their permission.

The techniques described here can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers, or portable, mobile, and handheld devices.

Such a computer program can be written in any form of programming language, including compiled or interpreted languages, and it can be deployed in any form, including as a stand-alone program or as a module, component, subroutine, or other unit suitable for use in a computing environment or a mobile environment. The program can be cloud-based, workstation based, or in the form of a mobile app, for example. A computer program can be deployed to be executed on one computer or on multiple computers at one site or distributed across multiple sites and interconnected by a communication network.

Steps of the techniques described here can be performed by one or more programmable processors executing a computer program to perform functions by operating on input data and generating output. Steps can also be performed by, and apparatus to perform the steps can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer or mobile device. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a monitor, for displaying information to the user and a keyboard and a pointing device, e.g., a mouse or a trackball, or a touch sensitive surface, by which the user can provide input to the computer (e.g., interact with a user interface element, for example, by clicking a button on such a pointing device or touching the surface). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described here can be implemented in a distributed computing system, for example, one operating in the cloud, that includes a back-end component, e.g., as a data server, and/or a middleware component, e.g., an application server, and/or a front-end component, e.g., a client computer having a graphical user interface and/or a Web browser or mobile app through which a user can interact, or any combination of such back-end, middleware, or front-end components. The components of the system can be interconnected by any form or medium of digital data communication, e.g., a communication network. Examples of communication networks include a local area network ("LAN"), a wide area network ("WAN"), e.g., the Internet, and cellular networks, and include both wired and wireless networks.

The computing system can include clients and servers. A client and server are generally remote from each other and typically interact over a communication network. The relationship of client and server arises by virtue of computer programs running on the respective computers or devices and having a client-server relationship to each other.

Other embodiments are within the scope of the following claims.

The invention claimed is:

1. A method comprising
at a cloud-based service, receiving digital image files from which digital images can be displayed on devices, each of the digital image files comprising a limited edition that includes one or more instances of the digital image file,
for each of the digital image files, using a process running on a computer to embed data in the digital image file on behalf of a party who has rights in the digital image file, the existence of the embedded data not being perceptible in any digital image that is displayed using the digital image file, the embedded data including information that can be used in a process of authenticating the digital image, the embedded data being uniquely associated with the limited edition,
receiving at the cloud-based service, a digital image file to be authenticated, and
authenticating the digital image file in a process running on a computer and that uses the embedded data.

2. The method of claim 1 in which the embedded data comprises a hash of data in the digital image file.

3. The method of claim 1 in which the embedded data can be used to locate information about the digital image file that has been stored at the cloud-based system.

4. The method of claim 1 comprising
storing at the cloud-based system information about the digital image file that can be retrieved based on the embedded data.

5. The method of claim 1 in which each of the digital image files is received through a publicly accessible communication network.

6. The method of claim 1 in which the embedded data includes a key or identifier to information about the instance of the digital image file that is stored at the cloud-based service, separately from the digital image file.

7. The method of claim 6 in which the information about the instance of the digital image file includes at least one of: an identification of a party who has rights in the instance of the digital image file, an identification of the edition to which the instance belongs, and an identification of the instance of the digital image file that is included in the limited edition.

8. The method of claim 1 comprising, after the digital image file has been authenticated, providing information to a user.

9. The method of claim 8 in which the information provided to the user is determined by characteristics of the user.

10. The method of claim 8 in which the information provided to the user includes the result of the authenticating.

11. The method of claim 8 in which the information provided to the user includes an identification of a party who has rights in the digital image file.

12. The method of claim 1 comprising, after the data has been embedded in the digital image file, providing information to a user.

13. The method of claim 12 in which the information provided to the user includes image data associated with the unique identifier of the instance of the digital image file.

14. The method of claim 12 in which the information provided to the user includes confirmation that the data has been embedded.

15. The method of claim 1 comprising storing the digital image files at the cloud-based service.

16. The method of claim 1 in which the digital image files are received from a web browser or a mobile app of a user device.

17. The method of claim 1 comprising receiving information that defines a limited edition of instances of the digital image file.

18. The method of claim 1 comprising providing an image storage system for distribution of instances of the digital image files subject to conditions specified on behalf of a party who has rights in the digital image file and agreed to by a user.

19. The method of claim 18 comprising delivering an instance of the digital image file to the user who has agreed to the conditions.

20. The method of claim 19 in which the user can display a digital image based on the instance of the digital image file.

21. The method of claim 1 in which the embedded data comprises a digital watermark.

22. A method comprising
from a cloud-based service, delivering to a user device an instance of a digital image file in which data has been embedded at the cloud-based service on behalf of a party who has rights in the digital image file, the embedding of data including associating by a process running on a computer, a unique identifier or key with a single instance of a limited edition of the digital image file, and
controlling the delivery of the instance of the digital image file containing the embedded data to the user in compliance with conditions that have been specified on behalf of the party who has rights in the digital image file, a digital image being displayable on a user device based on the instance of the digital image file.

23. The method of claim 22 in which the instance of the digital image file is delivered through a web browser or a mobile app.

24. The method of claim 22 in which the user device comprises a device that includes a screen and a processor that can display the digital image using the instance of the digital image file.

25. The method of claim 22 in which the instance of the digital image file comprises one instance among one or more instances of a limited edition of the digital image file.

26. The method of claim 22 in which the user device on which the display is occurs comprises a mobile phone, TV monitor, projector, or any other screen or display device.

27. A method comprising
at a user device, receiving an instance of a digital image file from a cloud-based service, the digital image file having had data embedded in it by a process running on a computer at the cloud-based service to protect rights of a user in the digital image file, the digital image file comprising a limited edition that includes one or more instances of the digital image file, the embedding having been done on behalf of a party who has rights in the digital image file, the existence of the embedded data not being perceptible in any digital image that is displayed using the digital image file, the embedded data including information that can be used in a process of authenticating the digital image, the embedded data being uniquely associated with the limited edition, the digital image file being received only on the basis of an agreement by a user to conditions for use of the digital image file, and displaying a digital image using the watermarked instance of the digital image file.

28. The method of claim 27 in which the digital image is displayed on a user device.

29. The method of claim 28 in which the user device on which the digital image is displayed is the user device that received the instance of the digital image file.

30. The method of claim 28 in which the user device on which the digital image is displayed is a device that is accessible to the user device that received the instance of the digital image file.

31. The method of claim 27 in which the user device comprises a wireless cellular device or a device that has access through the Internet to the cloud-based service.

32. The method of claim 27 in which the watermark of the digital image file is not perceptible in the digital image.

33. The method of claim 27 in which the instance is part of a limited edition of the digital image file.

34. An apparatus comprising
a cloud-based service that includes
cloud-based servers to provide storage service for digital image files and information about digital image files received from users, each of the digital image files comprising a limited edition that includes one or more instances of the digital image file,
processes to be run on the servers to embed data in the digital image files to protect rights of parties in the digital image files, the existence of the embedded data not being perceptible in any digital image that is displayed using the digital image file, the embedded data being uniquely associated with the limited edition, and
authentication processes to be run on the servers to authenticate digital image files received from users, the authentication processes being related to the data embedding processes.

35. The apparatus of claim 34 comprising
distribution processes to be run on the servers to distribute instances of the digital image files to users.

36. The apparatus of claim 34 comprising
occur processes to occur distribution of instances of the digital image files to users based on conditions imposed for the benefit of parties who have rights in the digital image files.

37. A method comprising
at a cloud-based server, using data of a digital image file to create a unique identifier for the file, the digital image file comprising a limited edition that includes one or more instances of the digital image file, the unique identifier being usable in a process of authenticating the digital image, the unique identifier being uniquely associated with the limited edition, using a process running on a computer to embed the unique identifier in the file, retrieving the unique identifier from the file, and using the unique identifier to locate information about the digital image file that is stored at the cloud-based server.

* * * * *

UNITED STATES PATENT AND TRADEMARK OFFICE
CERTIFICATE OF CORRECTION

PATENT NO. : 9,137,415 B2
APPLICATION NO. : 14/167618
DATED : September 15, 2015
INVENTOR(S) : Stefano De Vuono and Kimberly Gordon Page 1 of 1

It is certified that error appears in the above-identified patent and that said Letters Patent is hereby corrected as shown below:

In the claims,

Col. 16, line 54, claim 26, delete "is occurs" and insert -- occurs --

Signed and Sealed this
Third Day of May, 2016

Michelle K. Lee
*Director of the United States Patent and Trademark Office*